(12) United States Patent
Fu et al.

(10) Patent No.: US 11,979,966 B2
(45) Date of Patent: May 7, 2024

(54) COIL ASSEMBLY AND ELECTROMAGNETIC COOKING APPLIANCE

(71) Applicant: FOSHAN SHUNDE MIDEA ELECTRICAL HEATING APPLIANCES MANUFACTURING CO., LIMITED, Foshan (CN)

(72) Inventors: Zhengting Fu, Foshan (CN); Chuanbin Zhu, Foshan (CN); Xianhuai Chen, Foshan (CN); Linbo Zhu, Foshan (CN); Wei Chen, Foshan (CN); Wei Yuan, Foshan (CN); Yuquan Wu, Foshan (CN); Yuehong Qu, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 554 days.

(21) Appl. No.: 16/163,368

(22) Filed: Oct. 17, 2018

(65) Prior Publication Data

US 2019/0090315 A1 Mar. 21, 2019

Related U.S. Application Data

(63) Continuation of application No. PCT/CN2017/113712, filed on Nov. 30, 2017.

(30) Foreign Application Priority Data

May 27, 2017 (CN) .......................... 201720615384.7

(51) Int. Cl.
*H05B 6/12* (2006.01)
*H05B 6/44* (2006.01)

(52) U.S. Cl.
CPC .......... *H05B 6/1254* (2013.01); *H05B 6/1227* (2013.01); *H05B 6/1272* (2013.01); *H05B 6/44* (2013.01); *H05B 2206/022* (2013.01)

(58) Field of Classification Search
CPC ...... H05B 6/1254; H05B 6/1227; H05B 6/44; H05B 6/1272; H05B 2206/022; Y02B 40/00
See application file for complete search history.

(56) References Cited

U.S. PATENT DOCUMENTS

| | | | |
|---|---|---|---|
| 5,781,020 A | 7/1998 | Imai et al. | |
| 2011/0155723 A1* | 6/2011 | Liu | H05B 6/1245 219/672 |
| 2018/0199401 A1* | 7/2018 | Moon | H05B 6/1227 |

FOREIGN PATENT DOCUMENTS

| | | | |
|---|---|---|---|
| CN | 202665192 | * | 12/2011 |
| CN | 120769950 A | * | 11/2012 |

(Continued)

OTHER PUBLICATIONS

Notice of Reasons for Refusal, JP2018537760, dated Aug. 27, 2019, 8 pgs.

(Continued)

*Primary Examiner* — Dana Ross
*Assistant Examiner* — Joe E Mills, Jr.
(74) *Attorney, Agent, or Firm* — Morgan, Lewis & Bockius LLP

(57) ABSTRACT

Disclosed is a coil assembly and an electromagnetic cooking appliance. The coil assembly includes: a coil base, including a bottom wall and a side wall; a first coil and a second coil, fixedly located at the bottom wall and the side wall respectively; and a plurality of magnetic stripe supporters, located at the coil base along a circumferential direction. Each magnetic stripe supporter includes a first mounting part, a second mounting part, and a connecting part connected to (Continued)

the first mounting part and the second mounting part. The coil assembly in the disclosure can effectively reduce the mounting space for the magnetic stripe supporter, and prevent the interference between the magnetic stripe supporter and the circuit board supporter in the electromagnetic cooking appliance.

10 Claims, 7 Drawing Sheets

(56) References Cited

FOREIGN PATENT DOCUMENTS

| CN | 202665192 | U | | 1/2013 | | |
|---|---|---|---|---|---|---|
| CN | 104414476 | | * | 8/2013 | ............... | A47J 36/00 |
| CN | 203504791 | | * | 9/2013 | ............... | H05B 6/12 |
| CN | 203399971 | U | | 1/2014 | | |
| CN | 203504791 | U | | 3/2014 | | |
| CN | 203873542 | U | | 10/2014 | | |
| CN | 104414476 | A | | 3/2015 | | |
| CN | 105125049 | A | | 12/2015 | | |
| CN | 106136854 | A | | 11/2016 | | |
| CN | 206118078 | | * | 11/2016 | | |
| CN | 206004933 | U | | 3/2017 | | |
| CN | 206118078 | U | | 4/2017 | | |
| JP | H0461824 | A | | 2/1992 | | |
| JP | H08322711 | A | | 12/1996 | | |
| JP | H1156600 | A | | 3/1999 | | |
| JP | 2000139692 | A | | 5/2000 | | |
| JP | 2004305412 | A | | 11/2004 | | |
| JP | 2010214037 | A | | 9/2010 | | |

OTHER PUBLICATIONS

Notification of Reason for Refusal, KR1020187018951, dated Sep. 11, 2019, 15 pgs.
International Search Report and Written Opinion, PCT/CN2017/113712, dated Mar. 1, 2018, 11 pgs.—No English Translation Available.
Decision of Refusal, JP2018537760, dated Mar. 24, 2020, 10 pgs.
Foshan Shunde Midea Electrical Heatubg Appliances Manufacturing Co Ltd., Extended European Search Report, EP17889532.2, dated Apr. 10, 2019, 8 pgs.
Foshan Shunde Midea Electrical Heatubg Appliances Manufacturing Co Ltd., Communication Pursuant to Rules 70(2) and 70a(2), EP17889532.2, dated Apr. 29, 2019, 1 pg.
Foshan Shunde Midea Electrical Heating Appliances Manufacturing Co., Ltd., Communication pursuant to Article 94 (3), European Application No. 17889532.2, dated Mar. 3, 2021, 5 pgs.

* cited by examiner

COIL ASSEMBLY AND ELECTROMAGNETIC COOKING APPLIANCE

CROSS-REFERENCE AND PRIORITY CLAIMS

This application is a continuation application of PCT/CN2017/113712, entitled "COIL ASSEMBLY AND ELECTROMAGNETIC COOKING APPLIANCE" filed on Nov. 30, 2017, which claims priority to Chinese Patent Application No. 201720615384.7, filed with the State Intellectual Property Office of the People's Republic of China on May 27, 2017, and entitled "COIL ASSEMBLY AND ELECTROMAGNETIC COOKING APPLIANCE", all of which are incorporated herein by reference in their entirety.

TECHNICAL FIELD

This disclosure generally relates to the technical field of home appliance, and more particularly relates to a coil assembly and an electromagnetic cooking appliance.

BACKGROUND

The kitchen cooking appliances normally have two kinds of heating modes, heat pipe heating mode and electromagnetic induction heating mode. The electromagnetic induction heating mode has gradually been the main heating mode for its high heating efficiency and easy controlling of heating time. The currently induction heating (IH) products in use, such as, IH rice cooker, IH pressure cooker, and so on, are commonly provided with coil assembly located at the bottom of the cooker body including magnetic stripe to electromagnetic induction heat the cooker body. In the existing technology the magnetic stripe is normally fixed at the coil base through a magnetic stripe supporter. The magnetic stripe supporter is usually designed to connect with two mounting parts of the magnetic stripe supporter through a bending corner, as such a large gap is formed between the bending corner and the coil base, and the bending corner of the magnetic stripe supporter occupies a large space, which is a waste of the mounting space of the magnetic stripe supporter. At the same time, in order to prevent the interference between the bending corner and a circuit board supporter of the electromagnetic cooking appliance, the base supporter of the appliance body should be heightened, resulting an effect on the size of the appliance, and a higher manufacture cost.

SUMMARY

It is therefore one main object of this disclosure to provide a coil assembly, aiming to solve the technical problem of that in the existing technology the bending corner of the magnetic stripe supporter applied on the coil assembly occupies a large space, which badly affects the whole size of the electromagnetic cooking appliance.

In order to achieve the above object, the coil assembly proposed by this disclosure includes:

a coil base, including a bottom wall and a side wall, the side wall is formed by aslant extending upward and outward from a periphery of the bottom wall;

a first coil and a second coil, the first coil is fixed at an outer surface of the bottom wall, the second coil is disposed at an outer surface of the side wall; an outer periphery surface of the first coil, an outer surface of the coil base, and a bottom surface of the second coil cooperatively form an annular recess; and a plurality of magnetic stripe supporters, located at the coil base along a circumferential direction, the magnetic stripe supporter includes a first mounting part, a second mounting part, and a connecting part connected to the first mounting part and the second mounting part, the first mounting part is mounted at a bottom side of the first coil, the second mounting part is mounted at a side of the second coil away from the side wall, an extending surface of a bottom surface of the first mounting part, an extending surface of an outer-side surface of the second mounting part, and a surface of the connecting part away from the coil base cooperatively form an avoidance space.

Preferably, the connecting part has a slot facing the coil base.

Preferably, the connecting part includes a first bending portion and a second bending portion, the first bending portion is formed by bending upward from an end of the first mounting part away from the coil base, the second bending portion is connected to a bottom end of the second mounting part and an end of the first bending portion away from the first mounting part, the first bending portion and the second bending portion cooperatively form the slot.

Preferably, the connecting part is received in the recess, and the joint of the first bending portion and the second bending portion abuts against the outer surface of the coil base.

Preferably, the outer surface of the bottom wall of the coil base is protruded with a plurality of annular first separators which are mutually nested from inside to outside, any two adjacent first separators cooperatively form a first coil winding groove for receiving the first coil; and the outer surface of the coil base is protruded with a plurality of annular second separators arranged along an up and down direction, any two adjacent second separators cooperatively form a second coil winding groove for receiving the second coil.

Preferably, a wall surface of the top end of the second mounting part facing the coil base is defined with a clamping bulge, the clamping bulge is clamped in one second coil winding groove positioned at the top of the coil base.

Preferably, the connecting part is fixedly connected to the coil base.

Preferably, a side surface of the connecting part abutting the outer surface of the coil base is defined with a flange, the flange is formed with a fixing hole, the coil base is defined with a fixing post engaging the fixing hole.

Preferably, the coil assembly further includes a clipping component, the clipping component includes a clipping part and a pressing part, the clipping part is positioned at a side surface located at the joint of the connecting part and the second mounting part and adjacent to the outer surface of the coil base, the clipping part is formed with a clipping hole, the pressing part is positioned at the connecting part and adjacent to the clipping part, the freedom end of the pressing part corresponds to the clipping hole.

In order to achieve the above object, the present disclosure further provides an electromagnetic cooking appliance, which includes:

a coil assembly; and a circuit board supporter, including a first support part extending downward, and a second support part bending towards the coil panel from the bottom end of the first support part, one end of the second support part adjacent to coil panel is received in the avoidance space.

The magnetic stripe supporter of the coil assembly in the disclosure is fixedly located at the coil base, and the magnetic stripe supporter is set as a segmental structure which is suit for the coil base, the first mounting part is attached to the first coil fixedly located at the bottom wall of the coil base, the second mounting part is attached to the second coil disposed at the side wall of the coil panel, as such, the magnetic stripe supporter can cooperate with the coil base much closer, therefore, the magnetic stripe can adequately develop the function of magnetic conductivity; and the first mounting part is connected to the second mounting part through the connecting part, the extending surface of the bottom surface of the first mounting part, the extending surface of the outer-side surface of the second mounting part, and the surface of the connecting part away from the coil base cooperatively form an avoidance space, compared with that the bending corner of the tradition magnetic stripe supporter occupies a large space, the magnetic stripe supporter of the coil assembly in the disclosure can effectively save the space, and the circuit board supporter can cooperate with the avoidance space, such that the interference between the magnetic stripe supporter and the circuit board supporter in the electromagnetic cooking appliance can be prevented, and then the whole size of the electromagnetic cooking appliance is much smaller, further resulting a better appearance and a lower manufacture cost.

BRIEF DESCRIPTION OF THE DRAWINGS

To better illustrate the technical solutions that are reflected in various embodiments according to this disclosure or that are found in the prior art, the accompanying drawings intended for the description of the embodiments herein or for the prior art will now be briefly described. It is evident that the accompanying drawings listed in the following description show merely some embodiments according to this disclosure, and that those having ordinary skill in the art will be able to obtain other drawings based on the arrangements shown in these drawings without making inventive efforts, where in these drawings.

EXPLANATION OF REFERENCE SIGNS

Figure 1:
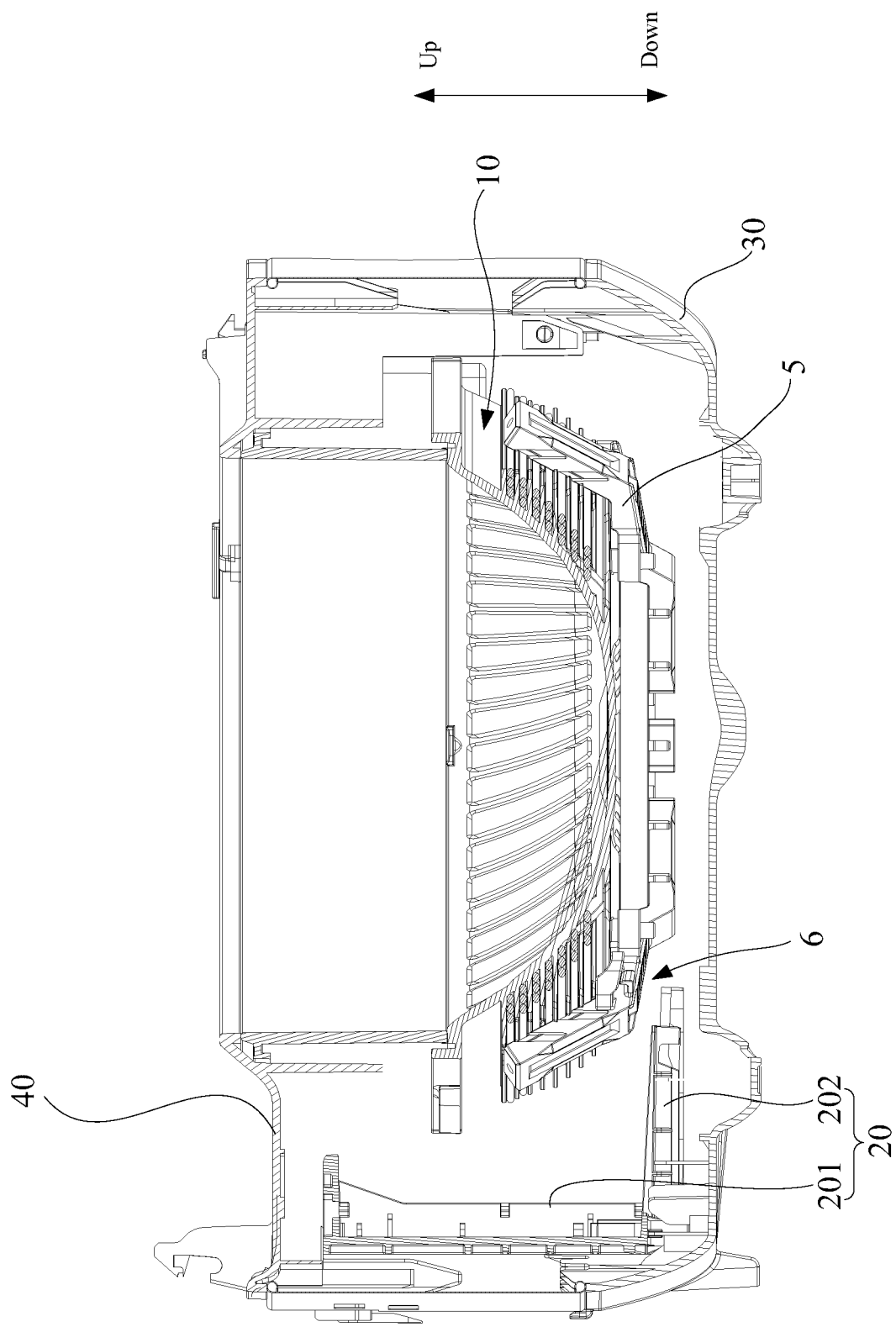
FIG. 1 is a cross section diagram of an electromagnetic cooking appliance of the present disclosure according to an exemplary embodiment.

| Label | Name | Label | Name |
| --- | --- | --- | --- |
| 10 | coil assembly | 534 | fixing hole |
| 1 | coil base | 6 | avoidance space |
| 11 | bottom wall | 61 | slot |
| 12 | side wall | 7 | first separator |
| 13 | fixing post | 71 | first coil winding groove |

-continued

| Label | Name | Label | Name |
| --- | --- | --- | --- |
| 2 | first coil | 8 | second separator |
| 3 | second coil | 72 | second coil winding groove |
| 4 | recess | 9 | clipping component |
| 5 | magnetic stripe supporter | 91 | clipping part |
| 51 | first mounting part | 911 | clipping hole |
| 52 | second mounting part | 92 | pressing part |
| 521 | clamping bulge | 20 | circuit board supporter |
| 53 | connecting part | 201 | first support part |
| 531 | first bending portion | 202 | second support part |
| 532 | second bending portion | 30 | base |
| 533 | flange | 40 | housing |

The realization of the aim, functional characteristics, advantages of the present disclosure are further described specifically with reference to the accompanying drawings and embodiments.

DETAILED DESCRIPTION

Technical solutions embodied in the embodiments of this disclosure will now be clearly and comprehensively described in connection with the accompanying drawings for these embodiments. Apparently, the described embodiments are merely some but not all embodiments of this disclosure. All other embodiments obtained by persons of ordinary skill in the art based on the embodiments of this disclosure without making creative efforts shall all fall within the protection scope of the present disclosure.

As used herein, all directional indicators (such as "upper," "lower," "left," "right," "front," "rear," . . . ) in the embodiments of this disclosure are merely used to explain the relative positions and movement or the like between various components under a specific posture (as shown in the drawings), and should the specific posture change, these directional indicators will also change accordingly.

In addition, terms such as "first," or "second," are intended for illustrative purposes only and are not to be construed as indicating or implying their relative importance or implicitly indicating the number of the specified technical features. Thus, features defined by terms such as "first," or "second" may explicitly or implicitly include at least one of such a feature. Additionally, technical solutions of various embodiments may be combined with one another, but such combinations must be based on the achievability by those of ordinary skill in the art. Where a combination of technical solutions ends up contradictory or unachievable, such a combination shall not be regarded as existent nor would it fall within the scope of protection of this disclosure.

The present disclosure provides an electromagnetic cooking appliance.

Figure 2:
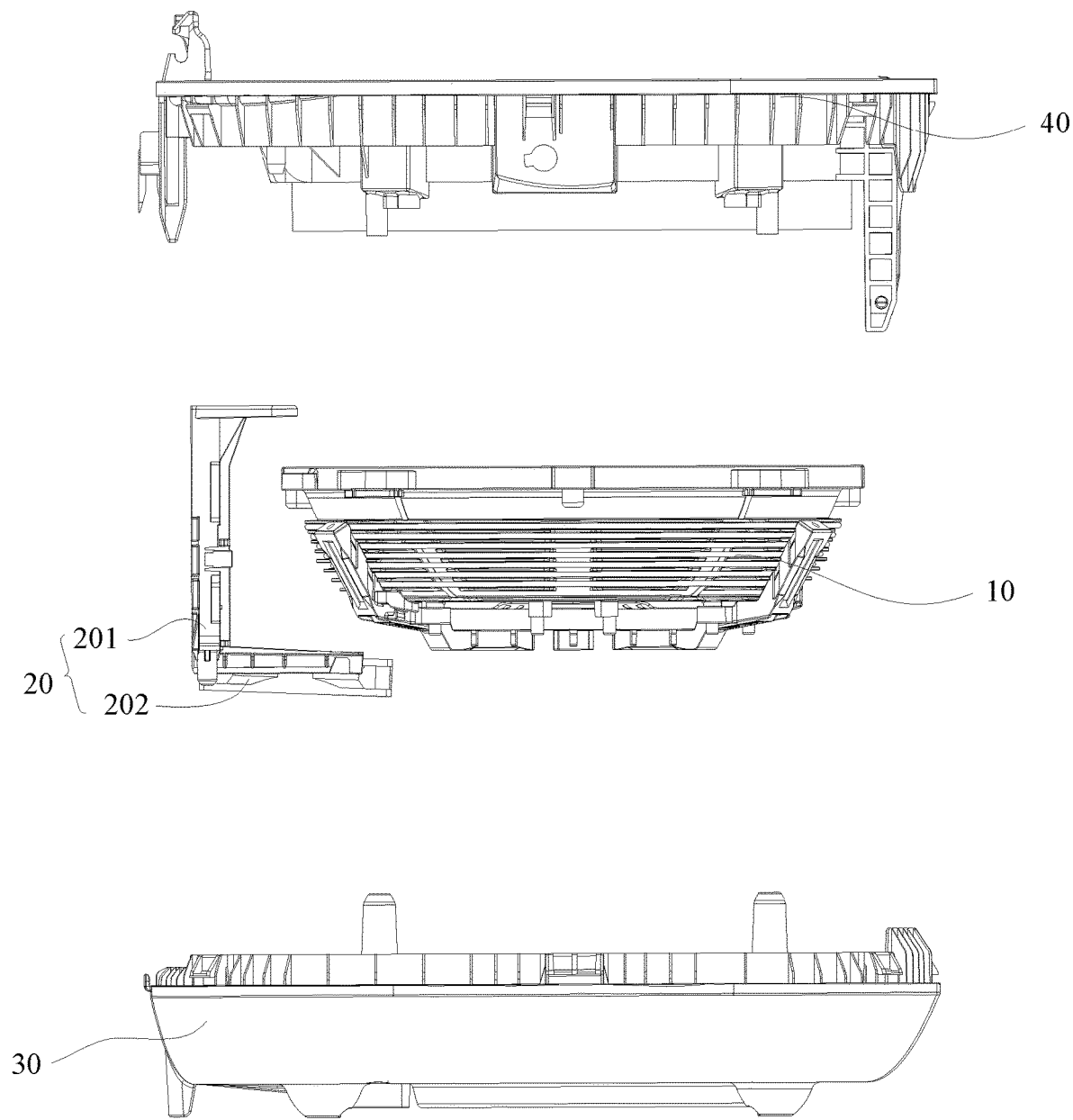
FIG. 2 is an exploded diagram of parts structures of the electromagnetic cooking appliance shown in FIG. 1.

In an exemplary embodiment, referring to FIGS. 1-2, the electromagnetic cooking appliance includes:

a coil assembly 10; and a circuit board supporter 20, which includes a first support part 201 extending downward, and a second support part 202 bending towards the coil assembly 10 from the bottom end of the first support part 201, one end of the second support part 202 adjacent to coil assembly 10 is received in an avoidance space 6.

In the exemplary embodiment, the electromagnetic cooking appliance can be an IH rice cooker, an IH electric cooker, or other cooking appliances having the similar structure; the electromagnetic cooking appliance includes a housing 40 having a receiving space, a base 30 fixedly connected to the housing 40, and the coil assembly 10 and a circuit board supporter 20 received in the receiving space of the housing 40, and so on; in order to ensure the heat dissipation effect of the electromagnetic cooking appliance, the circuit board supporter 20 received in a body is normally defined to be adjacent to the magnetic stripe supporter 5, and the second support part 202 of the circuit board supporter 20 is defined with a fan, one end of the second support part 202 of the circuit board supporter 20 adjacent to the coil assembly 10 is received in the avoidance space 6, such that the height of the first support part 201 can be reduced, and then the whole height of the body is also reduced, therefore, the whole size of the electromagnetic cooking appliance is miniaturized, resulting a lower manufacture cost.

The present disclosure also provides a coil assembly 10.

Figure 3:
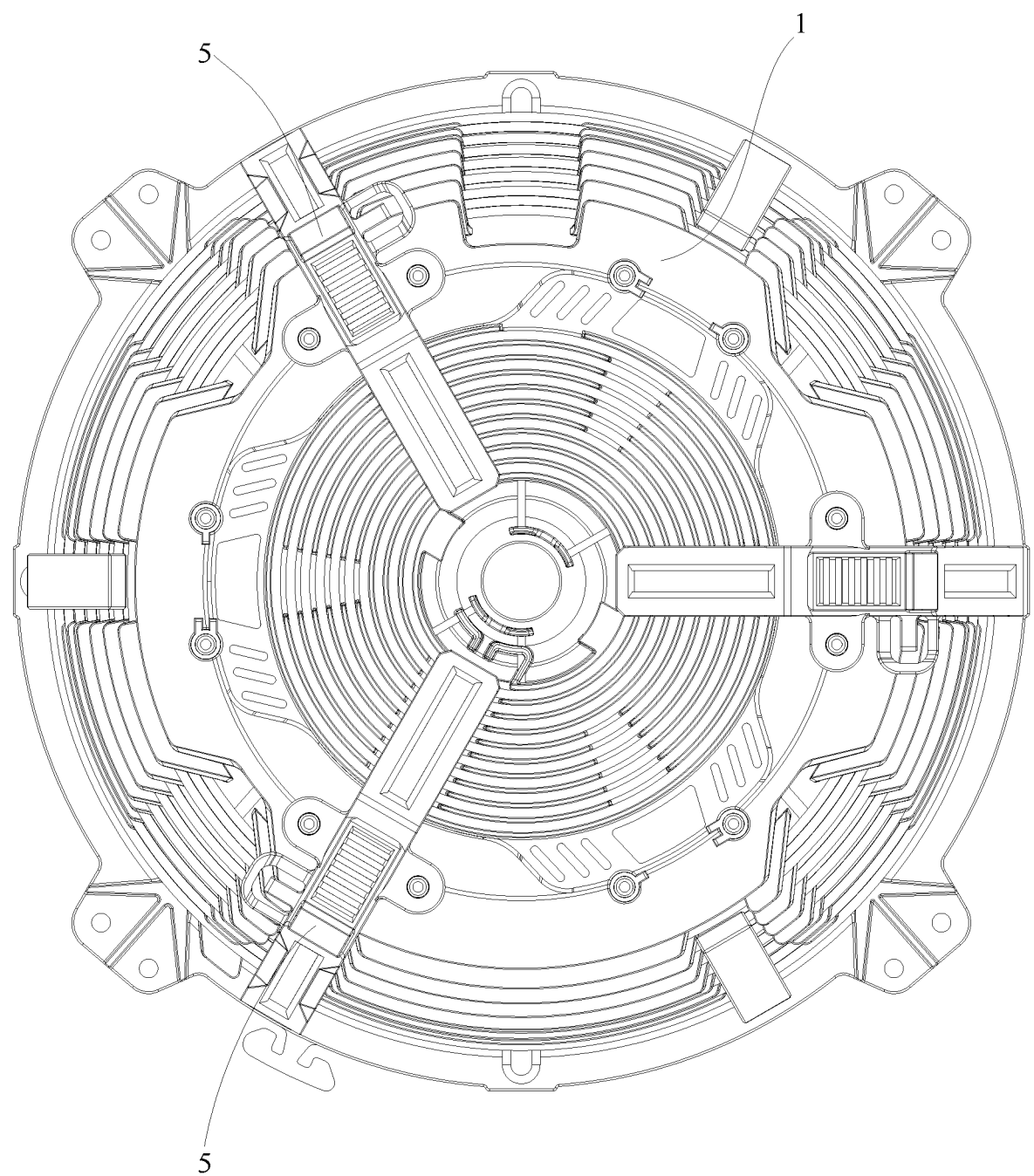
FIG. 3 is an upward diagram of a coil assembly shown in FIG. 1 according to an exemplary embodiment.
Figure 4:
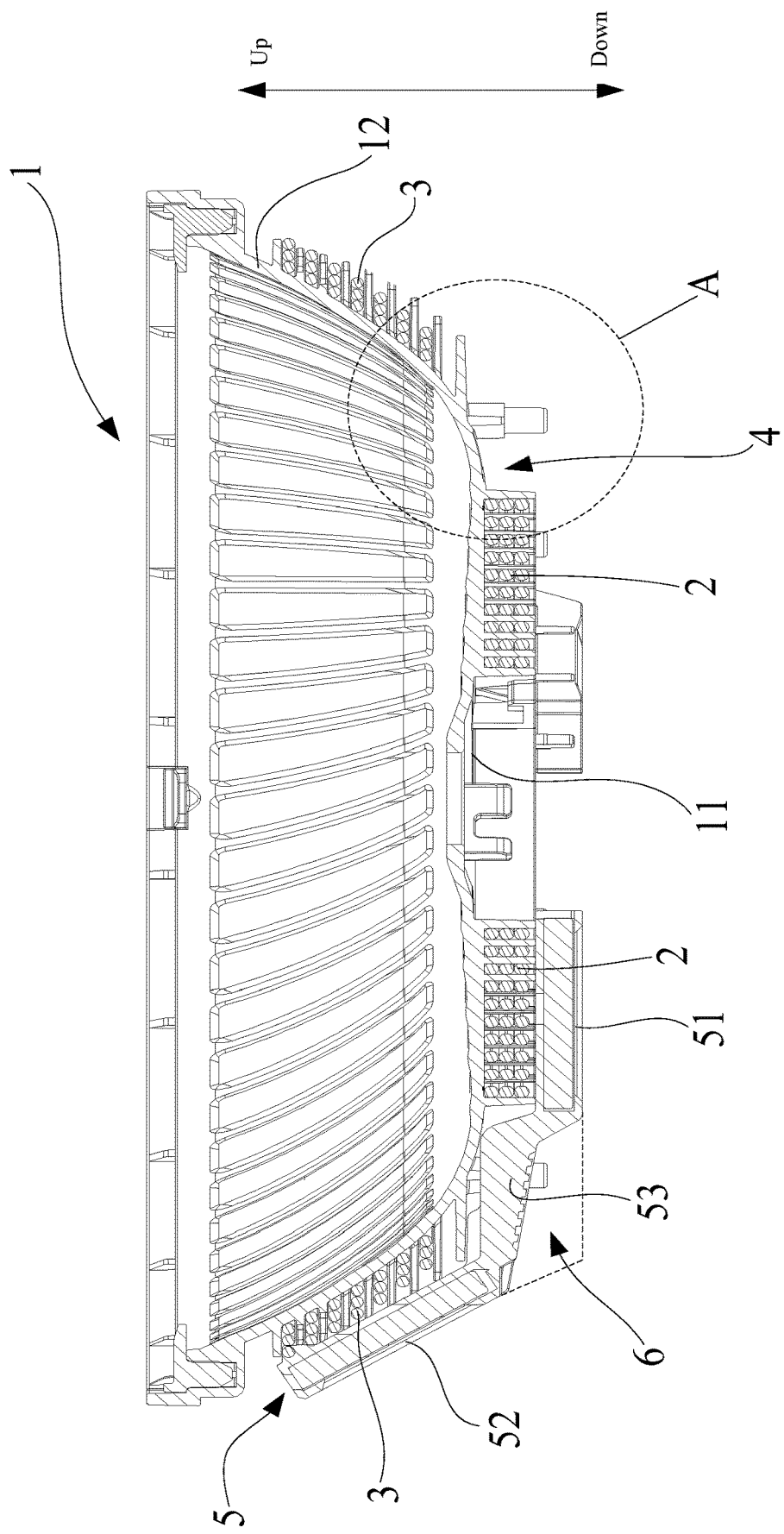
FIG. 4 is a cross section diagram of the coil assembly shown in FIG. 3.

In an exemplary embodiment, referring to FIGS. 3-4, the coil assembly 10 includes:

a coil base 1, including a bottom wall 11 and a side wall 12, the side wall 12 is formed by aslant extending upward and outward from a periphery of the bottom wall 11;

a first coil 2 and a second coil 3, the first coil 2 is fixed at an outer surface of the bottom wall 11, the second coil 3 is disposed at an outer surface of the side wall 12; an outer periphery surface of the first coil 2, an outer surface of the coil base 1, and a bottom surface of the second coil 3 cooperatively form an annular recess 4; and a plurality of magnetic stripe supporters 5, located at the coil base 1 along a circumferential direction, each of the magnetic stripe supporters 5 includes a first mounting part 51, a second mounting part 52, and a connecting part 53 connected to the first mounting part 51 and the second mounting part 52, the first mounting part 51 is mounted at a bottom side of the first coil 2, the second mounting part 52 is mounted at a side of the second coil 3 away from the side wall 12, an extending surface of a bottom surface of the first mounting part 51, an extending surface of an outer-side surface of the second mounting part 52, and a surface of the connecting part 53 away from the coil base 1 cooperatively form an avoidance space 6.

In the exemplary embodiment, the coil assembly 1 can have a disk-like structure having an open end, in actual application the open end of the coil assembly 1 is upward; the first coil 2 and the second coil 3 are both magnetic induction coils, and can be used for producing induction field when working, in order to avoid the produced induction field from radiating to outside of the body of magnetic cooking appliance, the periphery of the magnetic induction coil is normally provided with magnetic stripe, the working principle of the electromagnetic cooking appliance, one skilled person in the art can understand and master, no need to repeat again. In actual application the magnetic stripe supporter 5 can be set to fix the magnetic stripe, and the magnetic stripe can be fixedly located at the magnetic stripe supporter 5 through bonding, interference fit, and so on, can also be integrated with the magnetic stripe supporter 5 through injection molding; the magnetic stripe supporter 5 can be fixedly connected to the coil assembly 1 through bonding, screw fastening, or clamping connecting, and so on; the avoidance space 6 can be used for receiving the end of the second support part 202 of the circuit board supporter 20 adjacent to the coil assembly 10.

The magnetic stripe supporter 5 of the coil assembly 10 in the disclosure is fixedly located at the coil base 1, and the magnetic stripe supporter 5 is set as a segmental structure which is suit for the coil base 1, the first mounting part 51 is attached to the first coil 2 located at the bottom wall 11 of the coil base 1, the second mounting part 52 is attached to the second coil 3 disposed at the side wall 12 of the coil panel, as such, the magnetic stripe supporter can cooperate with the coil base 1 much closer, therefore, the magnetic stripe can adequately develop the function of magnetic conductivity; and the first mounting part 51 is connected to the second mounting part 52 through the connecting part 53, the extending surface of the bottom surface of the first mounting part 51, the extending surface of the outer-side surface of the second mounting part 52, and the surface of the connecting part 53 away from the coil base 1 cooperatively form an avoidance space 6, compared with that the bending corner of the tradition magnetic stripe supporter 5 occupies a large space, the magnetic stripe supporter 5 of the coil assembly 10 in the disclosure can effectively save the space, and the circuit board supporter 20 can cooperate with the avoidance space 6, such that the interference between the magnetic stripe supporter 5 and the circuit board supporter 20 in the electromagnetic cooking appliance can be prevented.

Figure 5:
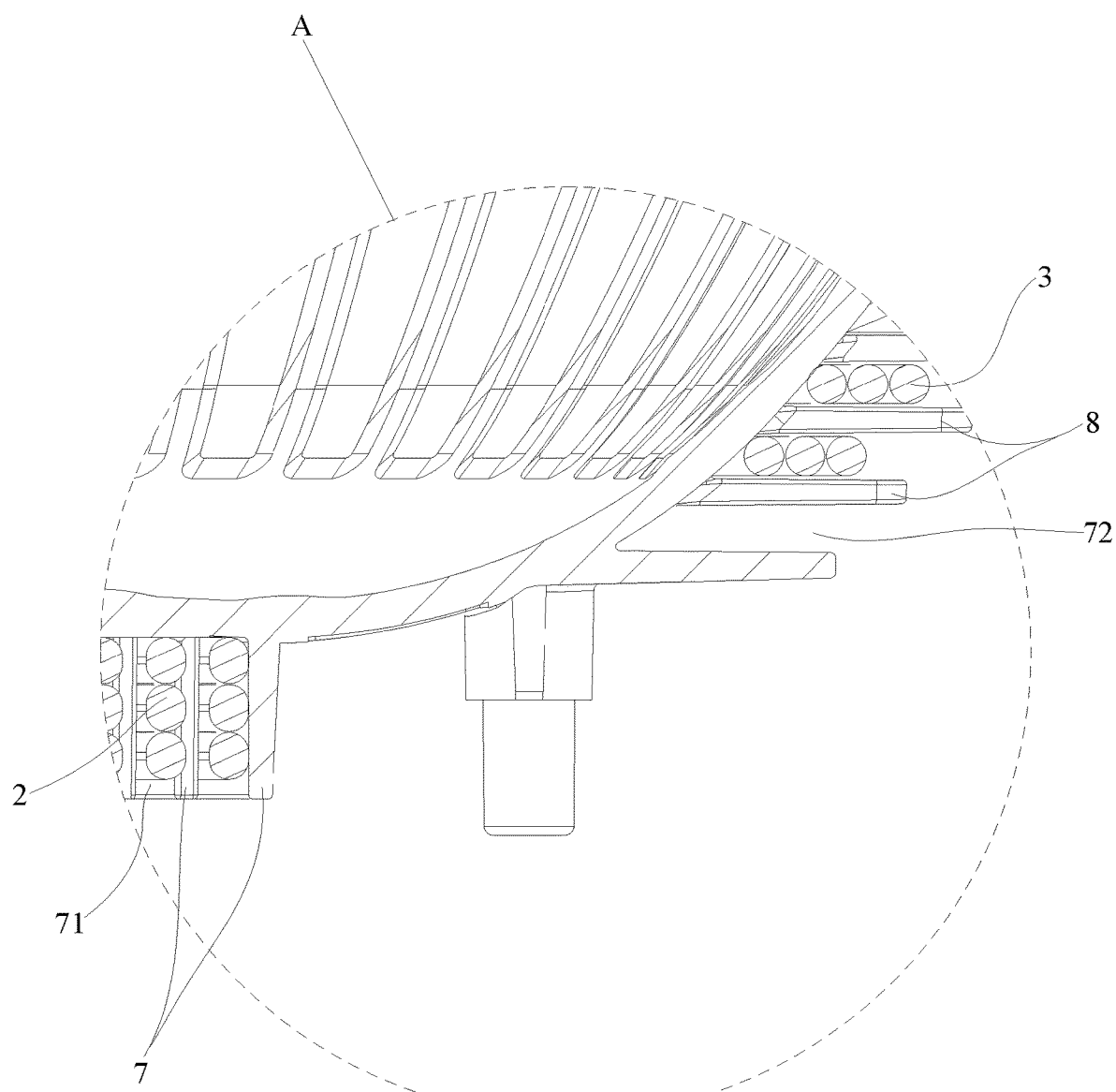
FIG. 5 is an enlarged diagram of portion A shown in FIG. 4.
Figure 6:
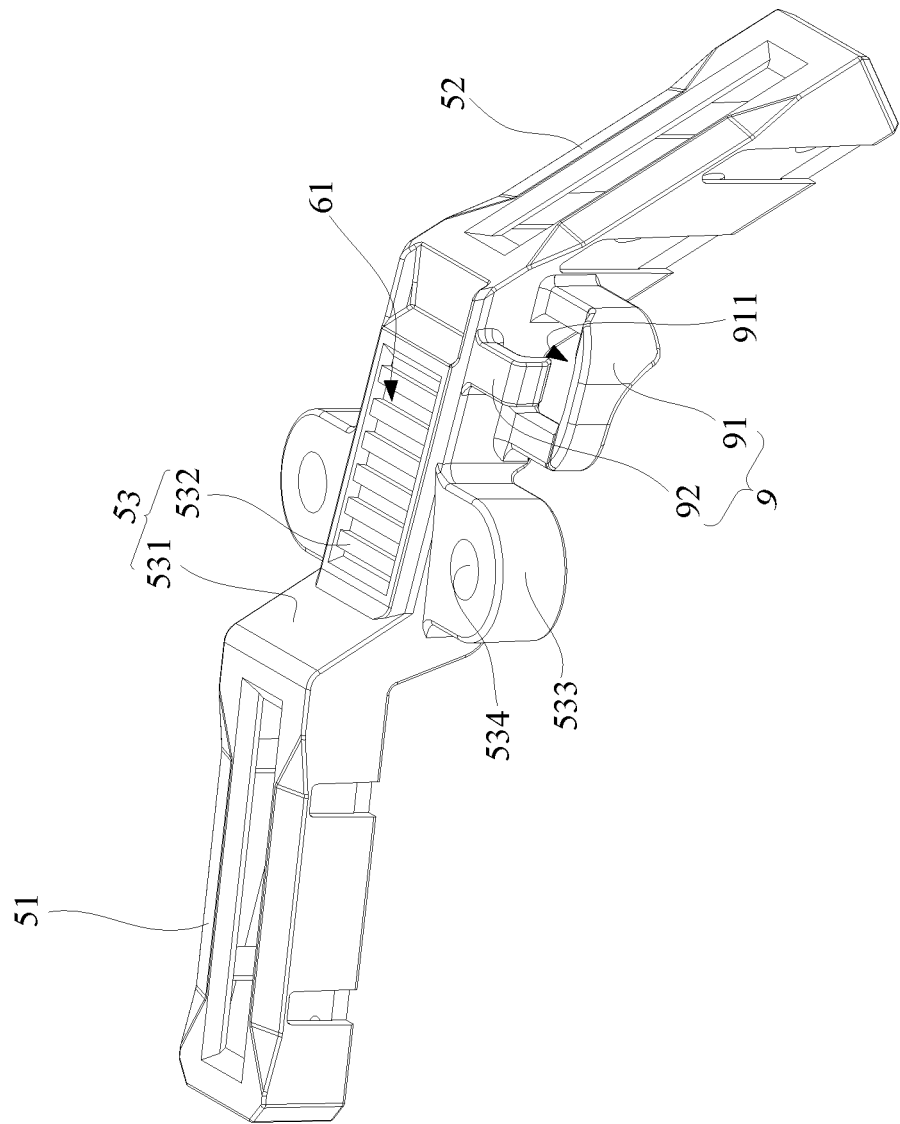
FIG. 6 is a structure diagram of the magnetic stripe supporter shown in FIG. 3.

Furthermore, please referring to FIGS. 4-6, in order to maximize the avoidance space 6, the connecting part 53 has a slot 61 towards the coil base 1.

Furthermore, the connecting part 53 includes a first bending portion 531 and a second bending portion 532, the first bending portion 531 is formed by bending upward from an end of the first mounting part 51 away from the coil base 1, the second bending portion 532 is connected to the bottom end of the second mounting part 52 and an end of the first bending portion 531 away from the first mounting part 51, the first bending portion 531 and the second bending portion 532 cooperatively form the slot 61.

In the exemplary embodiment, the first bending portion 531 and the second bending portion 532 cooperatively form the slot 61, such that the connecting part 53 occupies a smaller space, at the same time, the avoidance space 6 formed by the slot 61 can prevent the interference between the magnetic stripe supporter 5 and the circuit board supporter 20 in the electromagnetic cooking appliance.

Furthermore, in order to make the magnetic stripe supporter 5 the cooperate with the first coil 2 and the second coil 3 much closer, the connecting part 53 can be received in the recess 4, and the joint of the first bending portion 531 and the second bending portion 532 can resist on the outer surface of the coil assembly 1, to effectively utilize the space.

Furthermore, the outer surface of the bottom wall 11 of the coil base 1 is protruded with a plurality of annular first separators 7 which are mutually nested from inside to outside, any two adjacent first separators 1 cooperatively form a first coil winding groove 71, the first coil 2 is disposed in the first coil winding grooves 71; and the outer surface of the coil base 1 is protruded with a plurality of annular second separators 8 arranged along a vertical direction, any two adjacent second separators 8 cooperatively form a second coil winding groove 72, the second coil 3 is disposed in the second coil winding grooves 72.

In the exemplary embodiment, the first coil winding grooves 71 and the second coil winding grooves 72 can be set to locate and fix the first coil 2 and the second coil 3, as such the first coil 2 and the second coil 3 can be rapidly and accurately mounted on the coil assembly 1, at the same time, the continuous coiling mode can make the induction coil heat the body much more uniform, resulting a higher heating efficiency.

Figure 7:
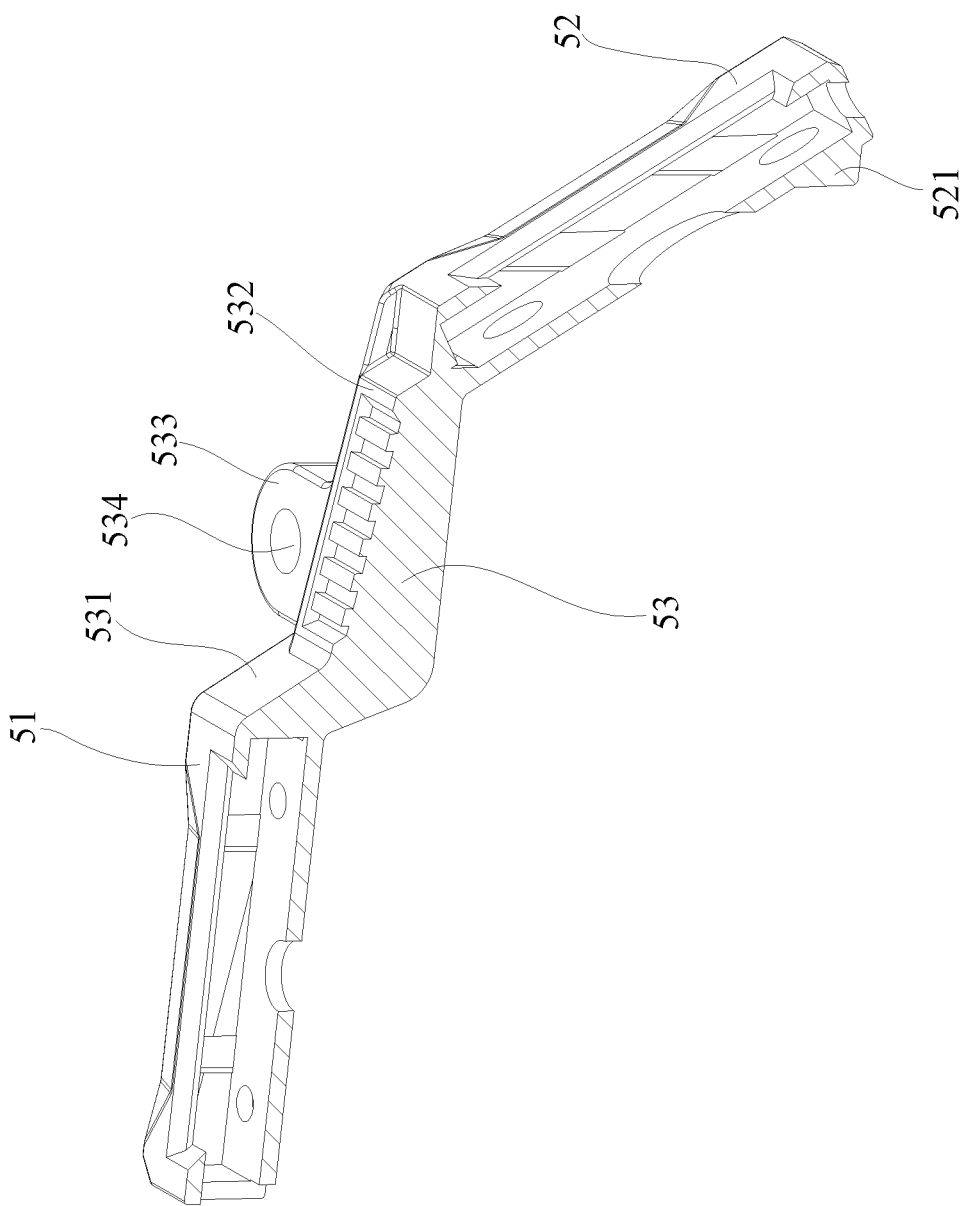
FIG. 7 is a cross section diagram of the magnetic stripe supporter shown in FIG. 6.

Furthermore, please referring to FIGS. 7-8, a wall surface of the top end of the second mounting part 52 facing the coil base 1 is defined with a clamping bulge 521, the clamping bulge 521 is clamped in one second coil winding groove 72 positioned at the top of the coil base 1.

In the exemplary embodiment, the cooperation between the clamping bulge 521 and the second coil winding groove 72 can be used from limiting the position of the second coil 3, for preventing second coil 3 from escaping from the second coil winding grooves 72.

Furthermore, the connecting part 53 is fixedly connected to the coil base 1.

In the exemplary embodiment, the connecting part 53 can be fixedly located on the coil assembly 1 through a method, such as, screw fastening, clamping connecting, bonding, and so on, for ensuring that the magnetic stripe supporter 5 can be fixedly mounted on the coil assembly 1.

Furthermore, a side surface of the connecting part 53 abutting the outer surface of the coil base 1 is defined with a flange 533, the flange 533 is formed with a fixing hole 534, the coil base 1 is defined with a fixing post 13 engaging the fixing hole 534.

In the exemplary embodiment, the fixing hole 534 can have the shape of round, square, triangle, etc; the shape of the cross section of the fixing post 13 matches with the shape of the fixing hole 534; preferably, the fixing hole 534 can be set to a round hole, the fixing post 13 can be set to a cylindrical shape; the magnetic stripe supporter 5 can be rapidly and accurately mounted on the coil assembly 1 through the cooperation between the fixing hole 534 and the fixing post 13, in actual application, in order to ensure the mounting stability, after the fixing post 13 passing through the fixing hole 534, a heating pressing treatment can be applied to make the connecting between the fixing post 13 and the fixing hole 534 much firmer.

Furthermore, the coil assembly 10 further includes a clipping component 9, the clipping component 9 includes a clipping part 91 and a pressing part 92, the clipping part 91 is positioned at a side surface located at the joint of the connecting part 53 and the second mounting part 52, and the side surface is adjacent to the outer surface of the coil base 1, the clipping part 91 is formed with a clipping hole 911, the pressing part 92 is positioned at the connecting part 53 and adjacent to the clipping part 91, the freedom end of the pressing part 92 corresponds to the clipping hole 911.

In the exemplary embodiment, through setting the clipping component 9, various lines in the body can all pass through the clipping hole 911 of the clipping part 91, and be limited by the pressing part 92, as such, the lines in the body can be neatly arranged, therefore saving the space in the body.

The foregoing merely portrays some exemplary embodiments of this disclosure and therefore is not intended to limit the patentable scope of the disclosure. Under the inventive concept of this disclosure, any equivalent structural changes based on the specification and accompanying drawings of the disclosure and any direct/indirect applications of the disclosure on other related technical fields shall all be compassed within the patentable scope of protection of the present disclosure.

What is claimed is:

1. An electromagnetic cooking appliance, comprising:
   a coil assembly having a coil base, the coil base having a bottom wall and a side wall, the side wall being formed by aslant extending upward and outward from a periphery of the bottom wall; and
   a circuit board supporter having a first support part extending downward toward the bottom wall of the coil base, and a second support part bending towards the coil assembly from a bottom end of the first support part, wherein the coil assembly further comprises:
   a first coil and a second coil, the first coil being fixed at an outer surface of the bottom wall, the second coil being disposed at an outer surface of the side wall; and
   a plurality of magnetic stripe supporters, located at the coil base along a circumferential direction, each magnetic stripe supporter having a first mounting part, a second mounting part, and a connecting part connected to the first mounting part and the second mounting part, wherein:
   the connecting part is received in an annular recess cooperatively formed by an outer periphery surface of the first coil, an outer surface of the coil base, and a bottom surface of the second coil,
   the first mounting part is mounted at a bottom side of the first coil,
   the second mounting part is mounted at a side of the second coil away from the side wall, and
   one end of the second support part is received in a first recess relative to a bottom surface of the first mounting part and an outer-side surface of the second mounting part, wherein the first recess is different from the annular recess, and a surface of the first recess is formed by a surface of the connecting part facing away from the coil base.

2. The electromagnetic cooking appliance according to claim 1, wherein the connecting part defines a slot recessed toward the coil base.

3. The electromagnetic cooking appliance according to claim 2, wherein the connecting part comprises a first bending portion and a second bending portion, the first bending portion is formed by bending upward from an end of the first mounting part away from the coil base, the second bending portion is connected to a bottom end of the second mounting part and an end of the first bending portion away from the first mounting part, the first bending portion and the second bending portion cooperatively form the slot.

4. The electromagnetic cooking appliance according to claim 1, wherein the connecting part is fixedly connected to the coil base.

5. The electromagnetic cooking appliance according to claim 1, wherein:
   the outer surface of the bottom wall of the coil base is protruded with a plurality of annular first separators which are mutually nested from inside to outside, any two adjacent first separators cooperatively form a first coil winding groove for receiving the first coil; and
   the outer surface of the coil base is protruded with a plurality of annular second separators arranged along a up and down direction, any two adjacent second separators cooperatively form a second coil winding groove for receiving the second coil.

6. The electromagnetic cooking appliance according to claim 5, wherein a wall surface of a top end of the second mounting part facing the coil base is defined with a clamping bulge, the clamping bulge is clamped in one second coil winding groove positioned at top of the coil base.

7. The electromagnetic cooking appliance according to claim 6, wherein the connecting part is fixedly connected to the coil base.

8. The electromagnetic cooking appliance according to claim 7, wherein a side surface of the connecting part abutting the outer surface of the coil base is defined with a flange, the flange is formed with a fixing hole, the coil base is defined with a fixing post engaging the fixing hole.

9. The electromagnetic cooking appliance according to claim 1, wherein the coil assembly further comprises a clipping component, the clipping component comprises a clipping part and a pressing part, the clipping part is positioned at a side surface located at a joint of the connecting part and the second mounting part and adjacent to the outer surface of the coil base, the clipping part is formed with a clipping hole, the pressing part is positioned at the connecting part and adjacent to the clipping part, a freedom end of the pressing part corresponds to the clipping hole.

10. The electromagnetic cooking appliance according to claim 1, wherein:
- a plurality of magnetic stripes are fixed to the magnetic stripe supporters, and each of the magnetic stripe supporters is fixedly located at the coil base, is set as a segmental structure which is suited for the coil base, and forms the first recess, the segmental structure comprising a first surface, a second surface, a third surface, and a fourth surface, wherein:
  - the first surface extends along a direction of the side of the second coil away from the side wall,
  - the second surface is adjacent to the first surface and extends along a direction of the bottom side of the first coil,
  - the third surface is adjacent to the second surface and extends along the direction of the first surface, and
  - the fourth surface is adjacent to the third surface and extends along the direction of the second surface.

* * * * *